(12) United States Patent
Floreancig

(10) Patent No.: US 9,692,326 B2
(45) Date of Patent: Jun. 27, 2017

(54) CIRCUIT AND METHOD FOR REDUCING INRUSH CURRENT OF A THREE PHASE MOTOR

(71) Applicant: Glen Floreancig, Phoenix, AZ (US)

(72) Inventor: Glen Floreancig, Phoenix, AZ (US)

(*) Notice: Subject to any disclaimer, the term of this patent is extended or adjusted under 35 U.S.C. 154(b) by 0 days.

(21) Appl. No.: 15/333,471

(22) Filed: Oct. 25, 2016

(65) Prior Publication Data

US 2017/0040914 A1    Feb. 9, 2017

Related U.S. Application Data

(63) Continuation of application No. 15/131,293, filed on Apr. 18, 2016, now Pat. No. 9,484,844.

(60) Provisional application No. 62/148,615, filed on Apr. 16, 2015.

(51) Int. Cl.
| | | |
|---|---|---|
| *H02P 1/30* | (2006.01) | |
| *H02P 27/08* | (2006.01) | |
| *H02P 1/26* | (2006.01) | |
| *H02M 5/458* | (2006.01) | |
| *H02M 1/36* | (2007.01) | |

(52) U.S. Cl.
CPC ............ *H02P 1/30* (2013.01); *H02M 1/36* (2013.01); *H02M 5/458* (2013.01); *H02P 1/265* (2013.01); *H02P 27/08* (2013.01)

(58) Field of Classification Search
CPC ............ H02P 1/30; H02P 1/265; H02P 27/08; H02M 5/4585; H02M 5/458; H02M 1/36

USPC ................ 318/430, 431, 495, 500, 503, 504
See application file for complete search history.

(56) References Cited

U.S. PATENT DOCUMENTS

| | | | |
|---|---|---|---|
| 2,423,348 A | 7/1947 | Short | |
| 3,221,243 A | 11/1965 | Tango et al. | |
| 4,618,809 A | 10/1986 | Maeda | |
| 4,644,241 A | 2/1987 | Maeda | |
| 4,745,348 A | 5/1988 | Young | |
| 4,777,421 A | 10/1988 | West | |
| 5,017,800 A | 5/1991 | Divan | |
| 5,272,616 A | 12/1993 | Divan et al. | |
| 5,402,053 A | 3/1995 | Divan et al. | |
| 5,824,990 A * | 10/1998 | Geissler | B23K 9/10 219/130.21 |
| 5,969,957 A | 10/1999 | Divan et al. | |
| 6,297,971 B1 | 10/2001 | Meiners | |
| 7,859,217 B2 | 12/2010 | Mayhew | |
| 2009/0059625 A1 | 3/2009 | Viitanen et al. | |

* cited by examiner

*Primary Examiner* — Bentsu Ro
(74) *Attorney, Agent, or Firm* — Venjuris P.C.

(57) ABSTRACT

A method and circuit for starting a three-phase motor in a manner that reduces inrush current normally associated with starting an AC motor. The method uses the circuit to start the three phase motor gradually with three phase alternating current having relatively low frequency and gradually increasing the frequency up to or above the motor operating frequency over a period of time and then switching in a steady state or static three phase alternating power supply to power the three phase motor.

18 Claims, 12 Drawing Sheets

CIRCUIT AND METHOD FOR REDUCING INRUSH CURRENT OF A THREE PHASE MOTOR

CROSS-REFERENCE TO RELATED APPLICATIONS

This application claims priority from pending U.S. application Ser. No. 15/131,293 filed Apr. 18, 2016, which claims benefit of U.S. Provisional Application No. 62/148,615 filed Apr. 16, 2015.

BACKGROUND OF THE INVENTION

Field of the Invention

The present invention relates to a circuit and method of reducing the inrush current of an induction motor. The circuit is particularly useful in phase conversion applications such as to convert single phase alternating current conversion to three phase alternating current.

Description of the Prior Art

It is common in the art to use a single phase VAC supply to operate a three phase motor to generate three phase VAC power at the three phase motor terminals. A single phase VAC supply comprised of a hot leg and neutral conductor is coupled to at least two of the AC induction motor terminals, or a phase-shift capacitor may be used between the hot leg and the third AC induction motor terminal. When connected to the single phase VAC supply having a steady-state voltage and frequency the three phase motor will result in a significant inrush current drawn from the single phase VAC supply. If on the other hand, three phase VAC power is available, the three phase motor can be started and run directly from the three phase VAC power. Regardless of whether the motor is started from single phase or three phase power, motor start events are generally accompanied by a temporary current draw of anywhere from 5-8 times the normal current draw. This temporary current demand can trip breakers or temporarily cause the power from the utility company to dip below acceptable standards. Thus, it is desirable to reduce or avoid inrush current encountered during three phase motor start events.

One manner of reducing inrush currents at three phase motor start events comprises using a Variable or Ramped Frequency three phase VAC drive or supply (VFD) to start the three phase motor. The VFD is coupled to the three phase motor and the frequency of the inverter three phase output is gradually increased until the three phase motor reaches a steady-state condition or a motor working speed. The gradual start of the three phase motor eliminates or significantly reduces inrush currents.

As one example, U.S. Pat. Nos. 5,272,616, 5,402,053, and 5,969,957 to Divan et al. disclose a single phase to three phase converter circuit that discloses converting single phase to DC and switching or inverting the DC to create three phase power. The converter may be operated in a startup mode, which provides three phase VAC power at a low frequency to start the motor and a second mode to wherein single-phase power is used to power the three phase motor. Divan et al. however teach that the inverter circuit is circuit is used to create single phase power which causes unnecessary expense and wear and tear on the components only during three phase motor start events. The present invention overcomes this and other shortcomings of the prior art.

BRIEF SUMMARY OF THE INVENTION

An abrupt start of an AC load such as an AC motor causes a large spike of inrush current from the very low impedance of the windings in a motor at rest. As the motor rises in speed the impedance of the windings increases and the generated back electromotive force (EMF) opposes the voltage applied to the windings thereby reducing the current through the windings. The inrush current can be in the range from 3-5 times the operating current necessary to keep the motor running at static or steady state operating speed. Objectives of the invention include a circuit and method of using the circuit to reduce or eliminate significant inrush currents.

The invention comprises a method and circuit for starting a three-phase motor in a manner that reduces inrush current normally associated with starting an AC motor. In the most general terms, the method comprises starting the three phase motor gradually rather than abruptly by the method of driving the motor terminals with alternating current having relatively low frequency and gradually increasing the frequency up to or above the motor operating frequency over a period of time. The gradual increase of the motor speed avoids the large inrush current associated with quick or abrupt starts.

The invention also comprises a system designed to accomplish the objectives of the invention and includes both a circuit and method of operating the circuit. Aspects of the system are implemented in a first subsystem to start the motor and a second subsystem to continue powering the motor after the first subsystem has had sufficient time to start the motor and gradually establish the motor steady state operating speed. The first subsystem may comprise a three phase supply with variable frequency and the second subsystem comprises a static single phase supply if phase convention is desired or a static three phase supply if available. Each subsystem is multiplexed or alternately coupled to a three phase AC motor based on timing control that enables connection of the three phase motor to the variable frequency supply, start of the variable frequency supply, subsequent disconnection of the variable frequency supply from the three phase motor, and subsequent connection of static three phase supply to the motor.

Aspects of the invention can be incorporated in a circuit and method for starting a three phase motor to accomplish both reduced inrush current and phase conversion, such as disclosed in prior U.S. patent application Ser. No. 15/131, 293, issued as U.S. Pat. No. 9,484,844, and which is hereby incorporated by reference in its entirety. Aspects can also be incorporated in system with access to three phase power i.e. a circuit and method for starting a three phase motor to reduce inrush current as further discussed below.

Aspects of the invention may be incorporated in a three phase motor starter, comprising a three phase VAC supply input and a VAC output, an AC direct relay coupled electrically in series between the three phase VAC supply input and the VAC output, a rectifier having a rectifier VAC input and a rectifier DC output, the rectifier VAC input coupled to the three phase VAC supply input, an inverter having an inverter circuit DC input, a plurality of inverter circuit switching inputs, and an inverter circuit three phase output, the inverter circuit DC input coupled to the rectifier DC output, an inverter contactor coupled electrically in series between the inverter circuit three phase output and the VAC output, and a controller having a plurality of inverter control outputs respectively coupled to the plurality of inverter circuit switching inputs. A three phase VAC supply is connectable to the VAC output through the AC direct relay and the inverter circuit three phase output is connectable to the VAC output through the inverter contactor. The AC direct relay and inverter contactor may each be selected from combination or a plurality of distinct switches, relays and contactors, or the equivalent thereof, and may be controlled such as by a control signal from a controller. The controller may operate a software program to increase the switching frequency of the inverter outputs from close to DC or 0 Hz to a frequency that is within about 20 Hz of the steady-state frequency. The rectifier may incorporate a diode bridge with one, two, or three of the phases from the three phase VAC supply.

Aspects of the invention may also be incorporated in a method of starting and running a three phase load at a steady-state operating frequency. The method may comprise coupling a three phase load such as motor to a VAC output, connecting a three phase VAC supply to a three phase VAC supply input, converting the three phase VAC supply to a direct current voltage, switching the direct current voltage with a variable frequency drive, coupling the VAC output to the variable frequency drive, and with the variable frequency drive, switching the direct current voltage from a starting frequency of about 0 Hz to a frequency within about 20 Hz of the three phase motor steady-state operating frequency, disconnecting the variable frequency drive from the VAC output, and coupling the three phase VAC supply input to the VAC output to continue to power and operate the three phase load.

DESCRIPTION OF PREFERRED EMBODIMENTS

Figure 1:
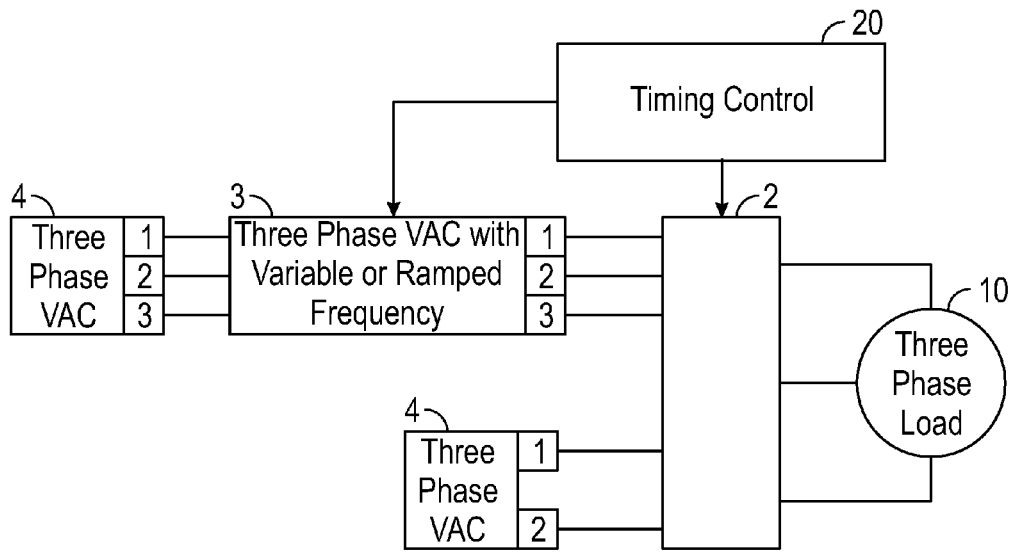
FIG. 1 illustrates a high-level block diagram illustrating a concept of the static three phase VAC supply to variable or ramped three phase converter described herein wherein a static three phase VAC supply 4 is switched or multiplexed 2 with a variable or ramped frequency three phase supply 3 based on a timing control 20.

With reference to the general conceptual block diagram of FIG. 1, a static three phase to variable or ramped three phase converter on which to implement the method of starting a three phase load or motor 10 comprises use of a static three phase single phase VAC supply 4 that is switched or multiplexed 2 using one or more switches, relays or contactors, with a variable or ramped frequency three phase supply 3 as controlled by timing control 20 to power a three phase motor 10. A general description of a preferred method of operation comprises coupling the variable or ramped frequency three phase supply 3 to a stopped three phase motor 10 and supplying the three phase motor 10 with three phase VAC power with gradually increasing frequency to gradually start the three phase motor 10 from 0 Hz to motor speed that is sufficient to cause the three phase motor 10 to have a back EMF that more closely matches the back EMF of a three phase motor 10 at normal operating speed, at which point the variable or ramped frequency three phase supply 3 is disconnected or switched or multiplexed 2 from the three phase motor 10 and the static three phase VAC supply 4 is coupled or switched or multiplexed 2 to the three phase motor 10 until the system power is switched off to allow the three phase motor 10 to come to a stop. Use of the static three phase to variable or ramped three phase converter according to the method described results in a significantly diminished, if not eliminated, inrush current relative to starting the three phase motor 10 by direct and immediate connection to the single phase VAC supply 4.

Figure 2:
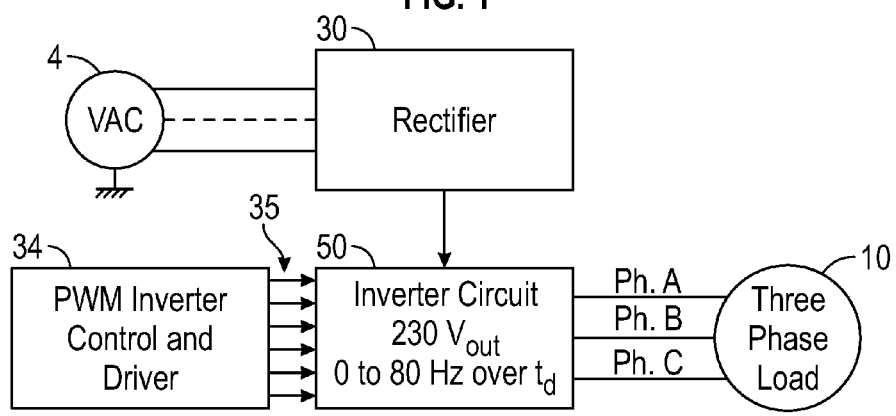
FIG. 2 illustrates a high-level block diagram of the variable or ramped frequency three phase supply 3 including a three phase VAC supply 4 coupled to a rectifier 30 to create direct current power that is supplied to a switching or inverter circuit 50 that will output three phase voltage on terminals connected to the three phase motor 10 based on the switch control timing 35 provided by an inverter control and driver circuit 34.

A conceptual block diagram of a variable or ramped frequency three phase supply 3 is illustrated in FIG. 2. The static three phase VAC supply 4 is converted to Direct Current (DC) voltage or power by a rectifier sub circuit 30, which converted DC voltage or power is coupled to a switching or inverter sub circuit 50. The rectifier 30 may preferably use or rectify all three phases of the static three phase VAC supply 4 or merely two phases as signified by the dashed line between the static three phase VAC supply 4 and the rectifier sub circuit 30. The inverter sub circuit 50 comprises three VAC outputs (i.e. "Ph.A", "Ph.B", and Ph.C.") that are coupled or coupleable the three phase motor 10 through one or more switches, relays, or multiplexers 2 and are controlled or are controllable by switch control timing 35, such as from a processor, microprocessor, or a controller 200, to be 120 degrees apart in phase. Moreover, switch control timing 35 controls the switching to gradually increase the frequency of the three VAC outputs until the back EMF of the three phase motor 10 more closely matches the back EMF of a three phase motor 10 operating or running at the steady-state or normal operating speed. Starting the three phase motor 10 in a manner intended to reduce or eliminate relatively large inrush currents comprises timing control 20 operating one or more switches 2 to (i) couple the variable or ramped frequency three phase supply 3 to the three phase motor 10 and power the three phase motor 10 until its speed approaches, meets or exceeds a static or steady-state operating speed, and at which condition timing control 20 (ii) decouples the variable or ramped frequency three phase supply 3 from the three phase motor 10 and (iii) couples the static three phase VAC supply 4 to the three phase motor 10.

FIG. 2 illustrates a block diagram of a subsystem to create a variable or ramped frequency three phase supply 3. A rectifier sub circuit 30 creates direct current (DC) voltage from the static three phase VAC supply 4 as is known in the art and can include soft-start, filtering and/or power regulating circuits to improve the quality of power delivered from the rectifier sub circuit 30 to an inverter sub circuit 50. Timing control 20 such as from a Pulse Width Modulated (PWM) inverter control 34 creates three phase drive signals 35 to control the timed switching of sold state device pairs in the inverter sub circuit 50 and gate the high voltage DC power created by the rectifier sub circuit 30 at timed intervals to create three phase power that is coupled to the three phase motor 10 terminals to start the three phase motor 10 and gradually bring it up to speed.

Figure 3:
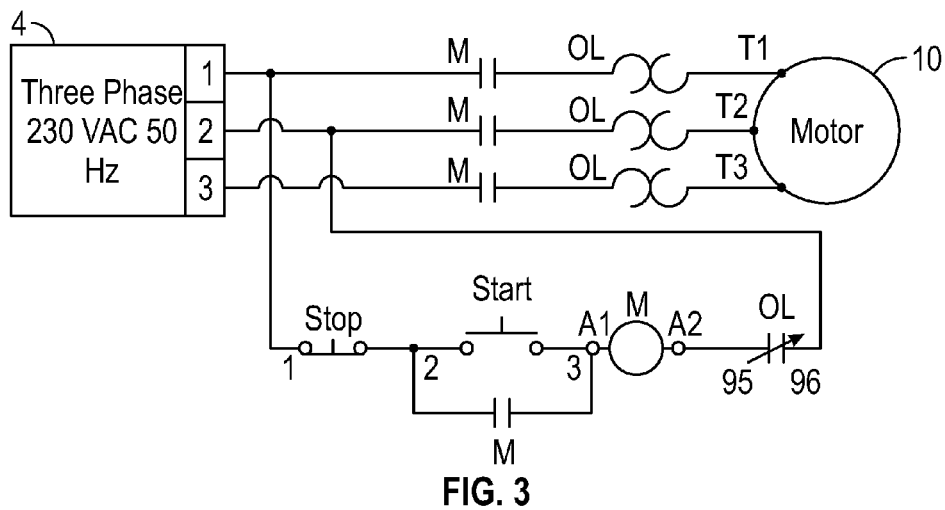
FIG. 3 illustrates a block diagram for a prior art circuit to start and power a three phase motor 10 from a three phase VAC supply 4.

FIG. 3 illustrates a general block diagram of a prior art three phase motor starter.

FIGS. 4-8 illustrate a preferred embodiment of a static three phase to variable or ramped three phase converter and includes components and sub circuits that implement the functions described herein. The use of the sub circuits and components permits an efficient relatively inexpensive apparatus and method to start and operate a three phase motor 10 whilst reducing or eliminating the inrush current normally associated with a three phase motor 10 start event. Further, despite that the preferred embodiment is disclosed in sub circuits, it would be within the skill of one of ordinary skill to modify the teachings herein to combine one or more of the sub circuits or create additional sub circuits that perform the same functions. A more detailed description of the connections between components and sub circuits follows.

The illustrated embodiment includes a three phase VAC supply input 40 having a VAC supply input first terminal 42, a VAC supply input second terminal 44, and a VAC supply input third terminal 46, and a VAC output 60 having a VAC output first terminal 62, a VAC output second terminal 64 and a VAC output third terminal 66. A static three phase VAC supply 4 is attachable to the three phase VAC supply input 40 and the static three phase to variable or ramped three phase converter operates the methods described herein and creates and outputs three phase power at the VAC output 60. In a first operational state or mode or startup mode, the static three phase to variable or ramped three phase converter operates a method to gradually start a three phase motor 10 from a stopped condition until the three phase motor 10 reaches a steady state operating speed, at which time or condition the static three phase to variable or ramped three phase converter switches to a second mode, a steady-state mode, and powers the three phase motor 10 directly from the static three phase VAC supply 4. Operation of the static three phase to variable or ramped three phase converter according to the described method results in significantly reduced inrush current for three phase motor 10 starting events.

The preferred static three phase to variable or ramped three phase converter incorporates a processor, microcontroller, or controller 200 that outputs control signals to implement timing control 20 outputs to the several sub circuits described herein and to one or more solid state or electromechanical contactors, switches, or relays to depending on whether the static three phase to variable or ramped three phase converter is in startup mode or in steady state mode. In startup mode, the controller 200 of the preferred static three phase to variable or ramped three phase converter controls or enables at least one electrically operable switch, contactor, or relay, a rectifier 30, and an inverter 50 to create three phase VAC power from the single phase VAC supply 4, which three phase VAC power is used to start the three phase motor 10 and gradually increase the speed of the three phase motor 10 until it reaches a steady-state speed as determined by programming or a time delay, or by actually measuring the speed of the three phase motor 10 using one or more sensors. Moreover, it is preferable but not necessary that one or more of the functions or circuits described herein be implemented in a distinct sub circuit that interoperates with other components or sub circuits within the static three phase to variable or ramped three phase converter described herein. Thus, despite that the rectifier 30 and inverter 50 are referred to as "sub circuits" in the preferred embodiment, it is to be understood that various implementations of either exist and different levels of integration within the system are included within the scope of the present description.

Figure 4A:
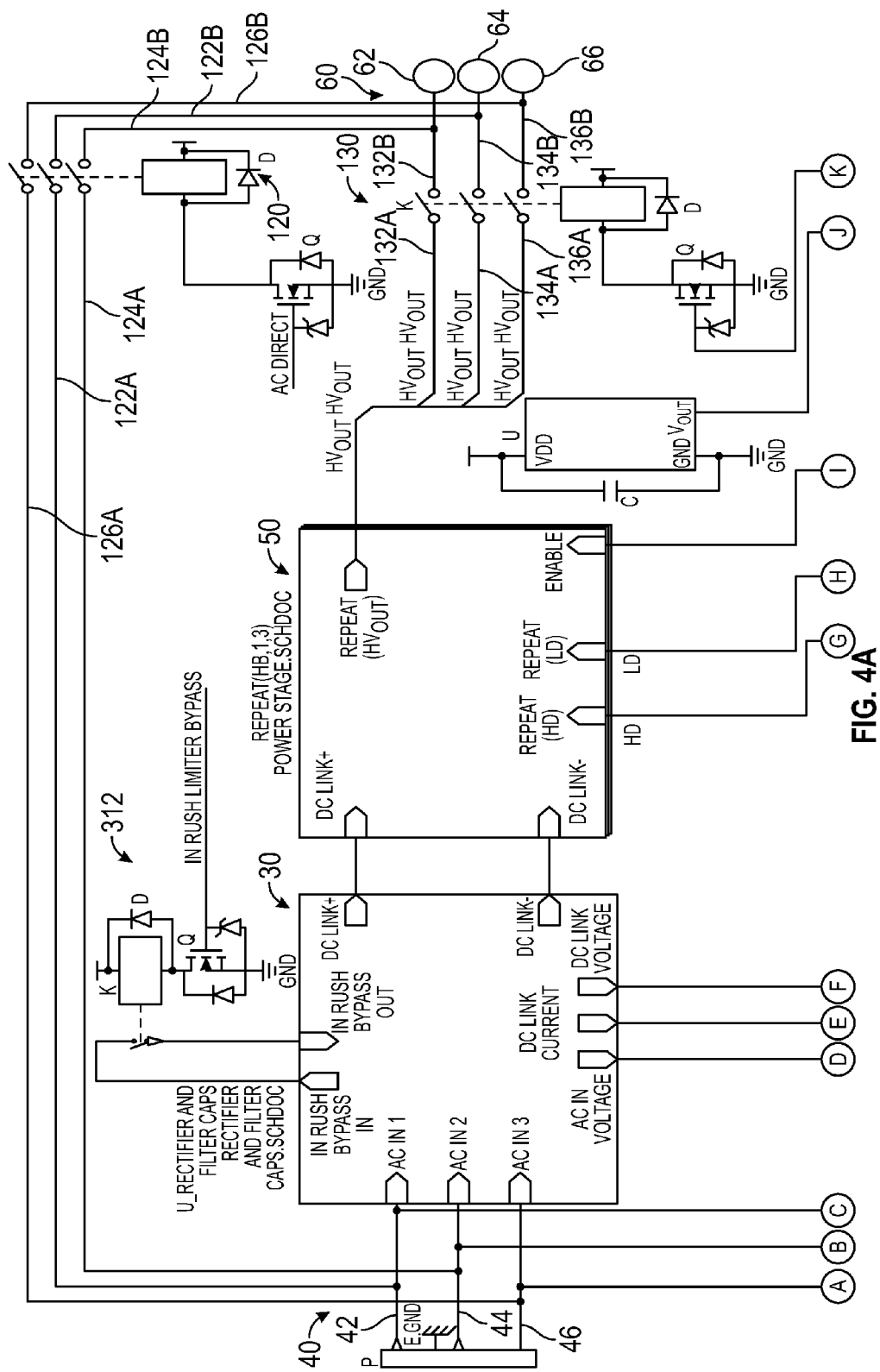
FIG. 4A illustrates a three phase VAC supply input 40, a rectifier sub circuit 30, and a switching or inverter sub circuit 50.
Figure 4B:
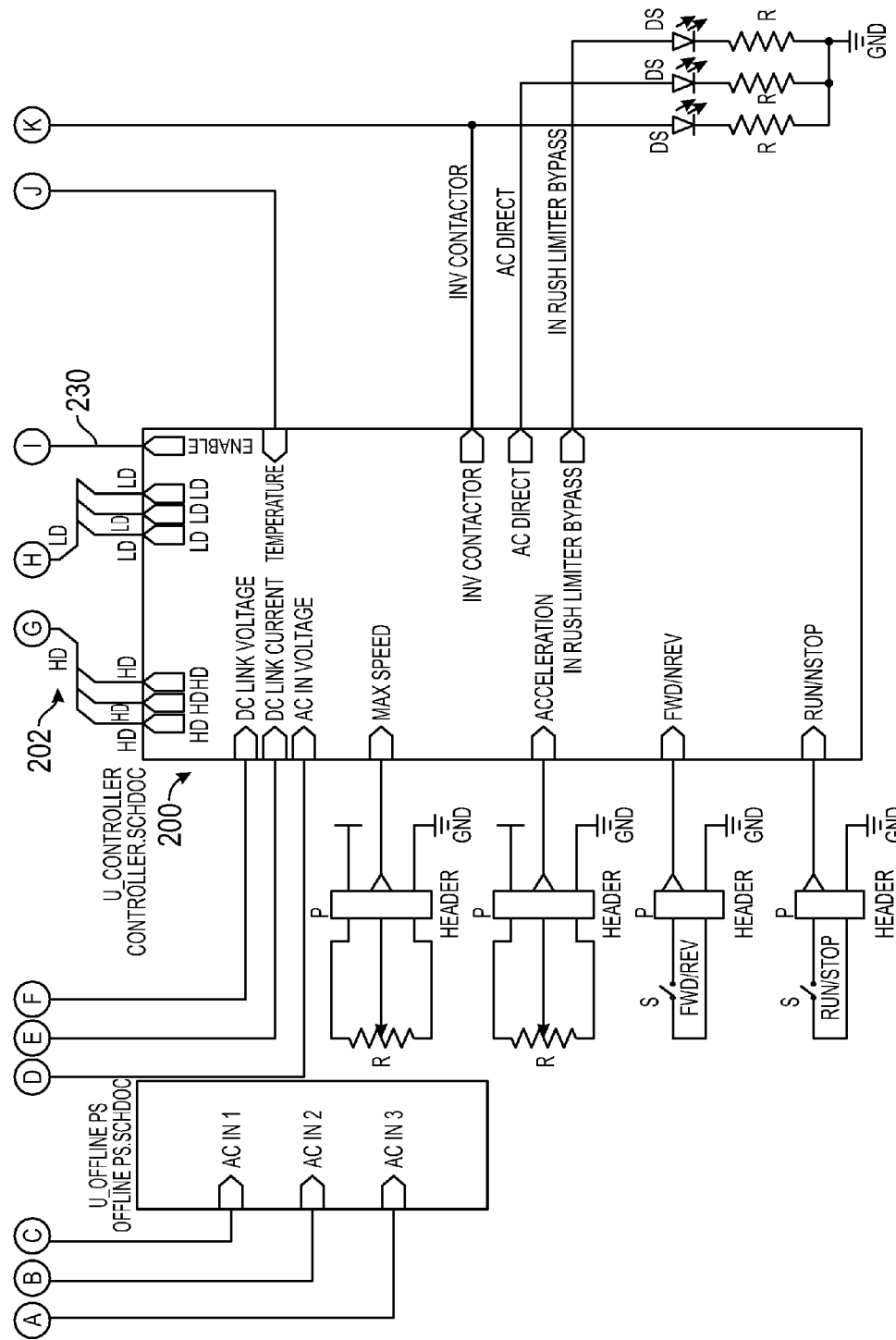
FIG. 4B illustrates a controller 200 that implements timing control 20, a first electrically operable TPST switch, contactor, or relay 120 and a second electrically operable TPST switch, contactor, or relay 130, and a three terminal VAC output 60 that can be coupled to a three phase motor 10.
Figure 5A:
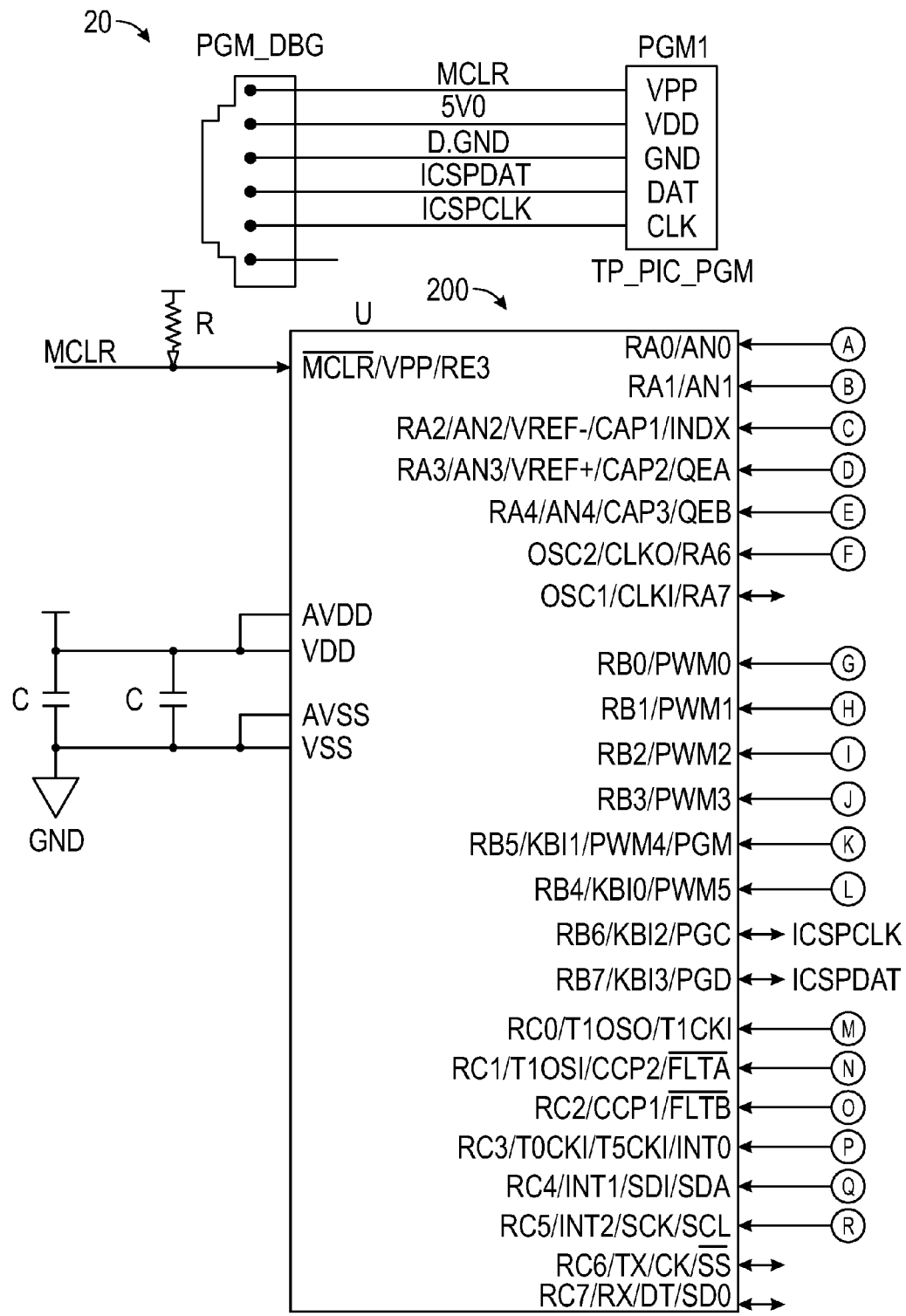
FIGS. 5A-5B illustrate additional details of an integrated solid state timing controller 200 implementing timing control 20 and having switch control timing 35 outputs in the form of a plurality of inverter control outputs 202, and a plurality of inputs and outputs including but not limited to, electrically operable switch outputs.
Figure 5B:
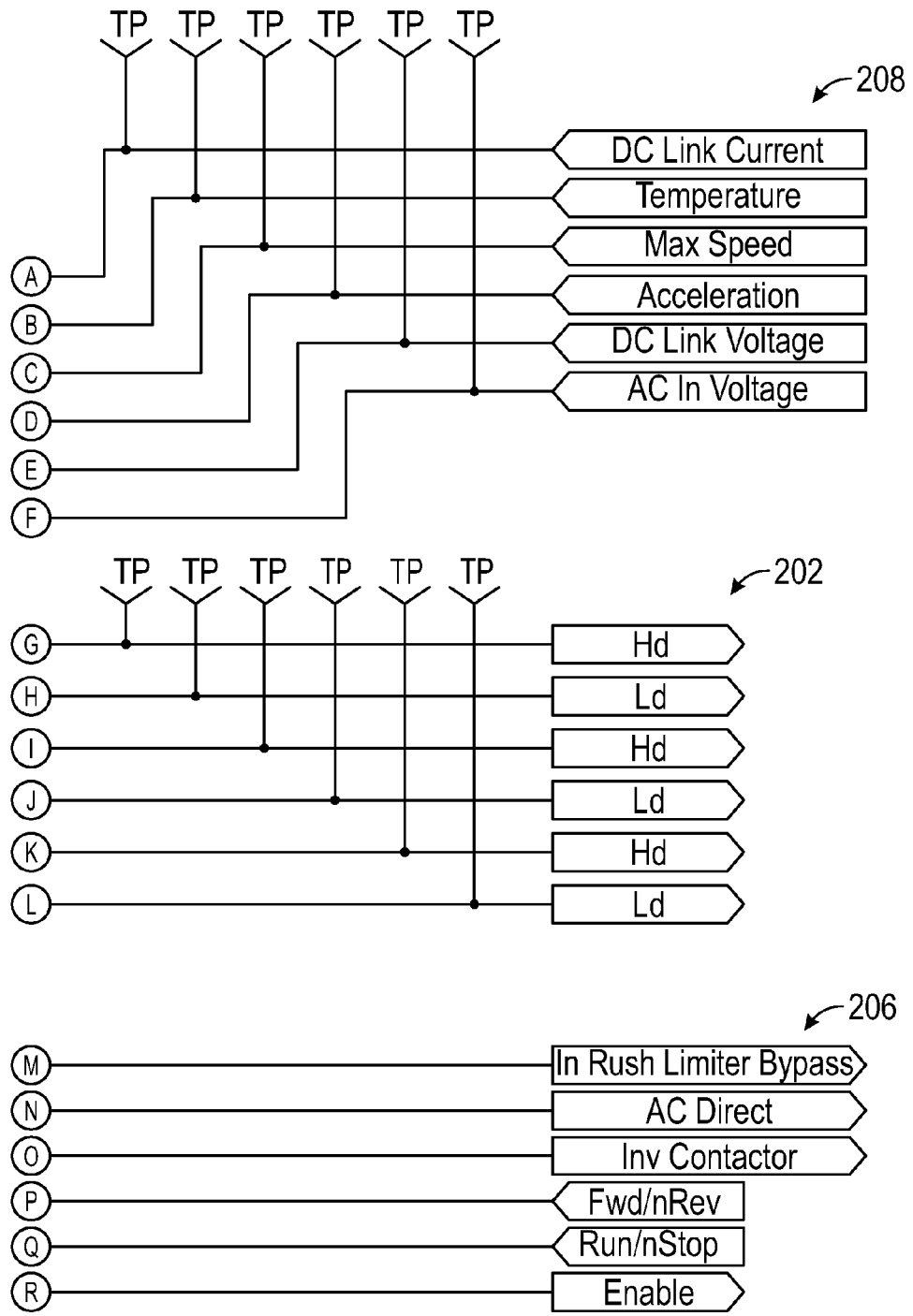

A preferred controller 200 is illustrated in FIGS. 4B, 5A, 5B, and includes a plurality of inverter control outputs 202, including a differential inverter control first output ("Hd1", "LD1"), a differential inverter control second output ("Hd2", "Ld2"), and a differential inverter control third output ("Hd3", "Ld3") that output a first phase, a second phase, and a third phase switching signals, respectively, and that are coupled to the inverter sub circuit 50 to control the switching of power transistors therein. Further timing control 20 outputs includes one or more control signals 206 such as but not limited to an AC direct relay control signal (e.g. "ACDirect") that controls an AC direct combination switch, contactor or relay during steady-state mode and an inverter contactor control signal (e.g. "InvContactor") that controls an inverter contactor, switch, or relay during startup mode. Additional control signals may include an inverter sub circuit enable signal (e.g. "Enable") to collectively enable an integrated gate driver that is coupled to and directs the switching of the power transistor outputs of the inverter sub circuit 50, and an inrush bypass limiter relay enable signal that controls an inrush limiter relay 312 that can disconnect the rectifier VAC input 302 of the rectifier sub circuit 30 from the hot conductor of the single phase VAC supply input 40 to prevent damage to the rectifier sub circuit 30 in the event of significant in rush current to the rectifier sub circuit 30 upon coupling of the three phase motor 10 to the single phase VAC supply input 40. The controller 200 may also include inputs 208 to accept feedback from sub circuits or other circuitry in the static three phase to variable or ramped three phase converter such as from a thermistor, or current or voltage sense inputs (e.g. DCLinkCurrent" and "DCLinkVoltage", respectively) or three phase motor 10 speed or acceleration inputs. An exemplary controller 200 comprises controller that includes Pulse Width Modulation (PWM) software routines for 3-phase AC induction motor control and programmable input/output ports, such as but not limited to, the PIC18F2431. An alternative controller 200 and configuration is described in the provisional patent from which the application claims benefit, with provisional application is hereby incorporated by reference in its entirety.

Electrical power to the preferred static three phase to variable or ramped three phase converter is input to a single phase VAC supply input 40, which includes a VAC supply input first terminal 42, a VAC supply input second terminal 44, and a VAC supply input third terminal 46. The first phase of the static three phase VAC supply 4 is coupled or attachable to the VAC supply input first terminal 42, the second phase of the static three phase VAC supply 4 is coupled or attachable to the VAC supply input second terminal 44, and the third phase of the static three phase VAC supply 4 is coupled or attachable to the VAC supply input third terminal 46. See FIG. 4A. In steady-state mode, the AC DIRECT relay control signal from the controller 200 enables the AC direct relay to connect the static three phase VAC supply 4 to the three phase motor 10 terminals and power the three phase motor 10 until a stop or shut-off event is initiated. Power from each of terminals of the static three phase VAC supply 4 is applied to the VAC supply input first, second, and third terminals 42, 44, and 46 conductors, respectively is also routed within the static three phase to variable or ramped three phase converter for use in sub circuits described below for use if the static three phase to variable or ramped three phase converter is in startup mode. Power from the static three phase to variable or ramped three phase converter in either mode however, is obtained from a VAC output 60, which includes a first VAC output first terminal 62, a VAC output second terminal 64, and a VAC output third terminal 66, which are respectively attachable to the terminals of a three phase load such as a motor 10.

Steady-state mode follows startup mode and is characterized by the three phase motor 10 operating a steady state speed or frequency. In steady-state mode the three phases of power from the single phase VAC supply 4 are respectively coupled through the AC direct relay and the VAC output 60 to the terminals of a three phase motor 10. The AC direct relay comprises a plurality of AC direct relay input terminals that are respectively connectable to a plurality of AC direct relay output terminals as enabled by an AC direct relay control terminal and the three phases of power on the conductors from the static three phase VAC supply 4 are respectively connectable or disconnectable to the three phase motor 10 by or through the plurality of AC direct relay input terminals and plurality of AC direct output terminals. Moreover, while the AC direct relay may be composed of individual switching components, a preferred AC direct relay is collectively electrically operable and may be selected from a triple pole single throw (TPST) device selected from switches, relays and contactors. Thus, an exemplary or preferred AC direct relay may comprise an electrically operable TPST switch, contactor or relay 120 as illustrated and the plurality of AC direct relay input terminals comprise a TPST device input first terminal 122A, a TPST device input second terminal 124A, and a TPST device input third terminal 122C, respectively, and the plurality of AC direct output terminals a TPST device output first terminal 122B, a TPST device output second terminal 124B, and a TPST device output third terminal 124C respectively, and the AC direct relay control terminal comprises a TPST device coil terminal 126. Alternative embodiments are also possible and it would be within the knowledge of one of ordinary skill to use a plurality of electrically operable single pole single throw switches, relays, or contactors, to couple the conductors of the three phase VAC supply input 40 to the three phase motor 10. As an example, the conductors from the static three phase VAC supply 4 could be coupled to the three phase motor 10 by a first, second, and third switches respectively, which switches are respectively coupled electrically in series with the conductors of the static three phase VAC supply 4 and the VAC output 60. In such embodiment, the AC direct relay is comprised of a combination of the switches. Each switch includes a switch input terminal, a switch output terminal, and a switch control terminal wherein each switch input terminal is coupled to one terminal of the three phase VAC supply input 40, and each switch output terminal is coupled to one of the VAC output terminal 62, 64, 66. Each switch control terminal is coupled to an AC Direct relay control signal and enables or disables current flow between the switch input terminal and the switch output terminal. In such an alternative embodiment, each switch input terminal would comprise a TPST device input terminal, each switch output terminal would comprise a TPST device output terminal, and each switch control terminal would collectively comprise a TPST device coil terminal. While steady-state mode relies on the static three phase VAC supply 4 to power the three phase motor 10 as described above; startup mode creases ramped or variable phase 3-phase VAC power to start the three phase motor 10 as described below.

In startup mode the static three phase to variable or ramped three phase converter uses the static three phase VAC supply 4 power to create three phase VAC power at the VAC output 60. The static three phase VAC supply 4 power is rectified and switched by an inverter sub circuit 50 to create variable frequency three phase VAC power that is used to gradually start the three phase motor 10. The controller 200 operates an inverter contactor to couple the variable frequency three phase VAC power to the VAC output 60 and start the three phase motor 10. The inverter contactor preferably comprises a combination device but may alternatively be comprised of individual components such as for example, a third, fourth and fifth switch, each having a switch input terminal, a switch output terminal, and a switch control terminal. In such an embodiment, the third switch input terminal may be coupled to the inverter first phase VAC output 504A and the third switch output terminal coupled to the VAC output first terminal 62, the fourth switch input terminal may be coupled to the inverter second phase output 504B and the fourth switch output terminal coupled to the VAC output second terminal 64, and likewise, the fifth switch input terminal may be coupled to the inverter third phase output 504C and the fifth switch output terminal coupled to the VAC output third terminal 66. Further, the controller 200 may have a plurality of switch control outputs coupled to the first, second, third, fourth, and fifth switch control terminals, respectively. While the inverter contactor may be implemented in distinct devices, the preferred inverter contactor is collectively electrically operable and selected from electrically operable triple pole single throw (TPST) devices selected from TPST switches, relays and contactors. Thus the third switch input terminal, the fourth switch input terminal, and fifth switch input terminal comprise a TPST device input first terminal 132A a TPST device input second terminal 134A, and a TPST device input third terminal 136A, respectively, and the third switch output terminal, the fourth switch output terminal, and the fifth switch output terminal comprise a TPST device output first terminal 132B, a TPST device output second terminal 134B, and a TPST device output third terminal 136B. The third switch control terminal, the fourth switch control terminal, and the fifth switch control terminal collectively comprise a TPST device coil terminal 138.

As is known in the art, the input and output and terminal numbers of the AC DIRECT relay 120 or the inverter contactor relay 130, which each may be comprised of an electrically operable triple pole single throw (TPST) device (See FIGS. 4A and 4B), are arbitrary and the identification thereof should not be interpreted to imply otherwise. Moreover, either or both the AC DIRECT relay 120 or the inverter contactor 130 may be either a normally-closed or normally-open variety provided that the controller 200 is programmed to open or close the each relay according the requirements of the methods and circuit described herein. Additionally, rather than operating either or both of the AC DIRECT relay 120 or the inverter contactor 130 based on control signals from the controller 200, it is alternatively possible to operate or control either or both devices off a time delay function or circuit. For example, a three phase motor 10 start event could start a count down on a timer that gives sufficient time for the startup mode to complete its operation, after expiration of the timer countdown would trigger a decoupling or opening of the inverter contactor 130 and a subsequent closing of the AC DIRECT relay 120. Of course, this is but one alternative of which there are others that would be obvious to a person having ordinary skill in light of the teachings and results intended herein.

Figure 6A:
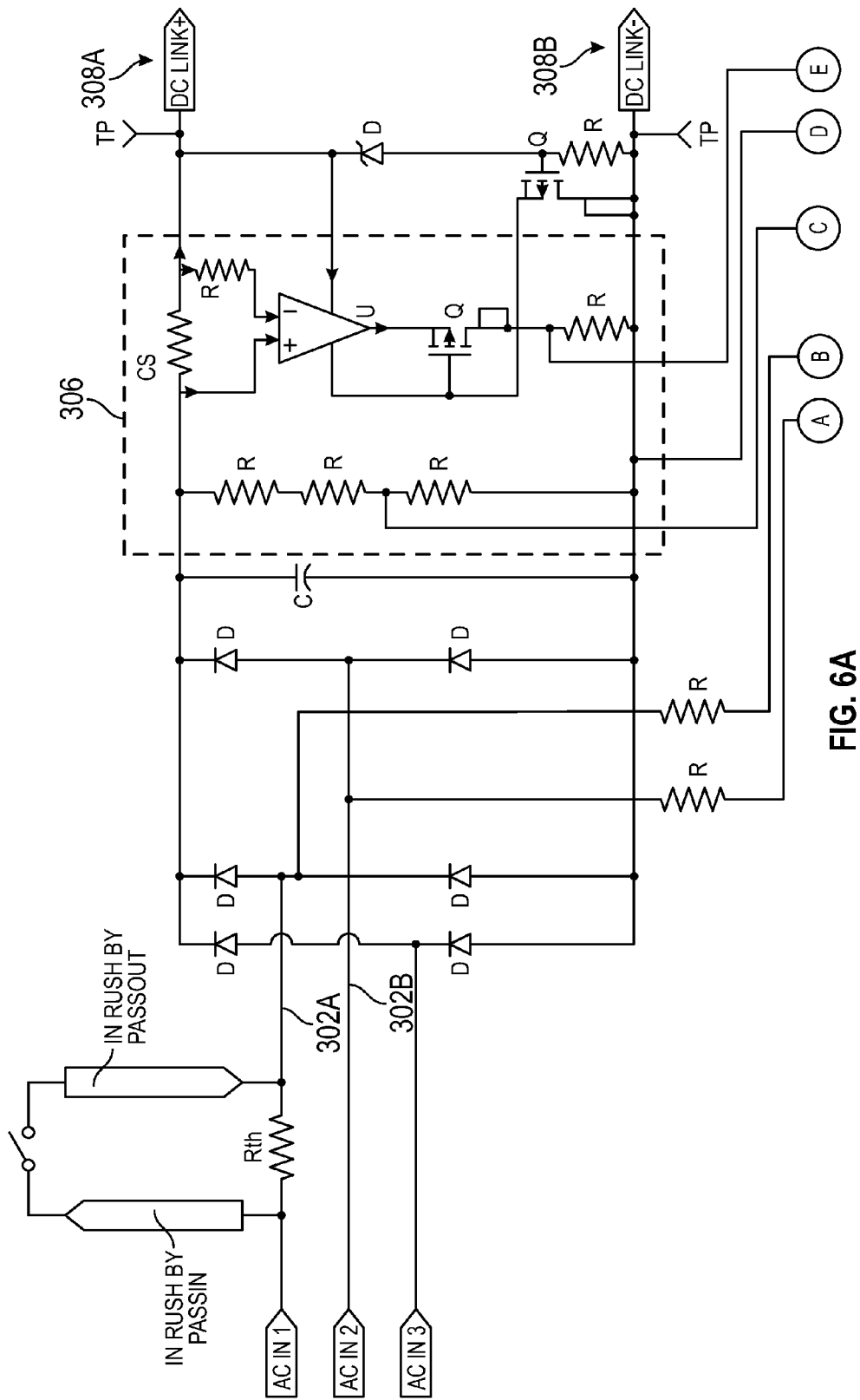
FIGS. 6A-6C illustrate a rectifier sub circuit 30 including diode bridge input terminals, 302A and 302B, diode bridge output terminals 308A and 308B, a current sense circuit 306, and a sensing output circuit 310.
Figure 6B:
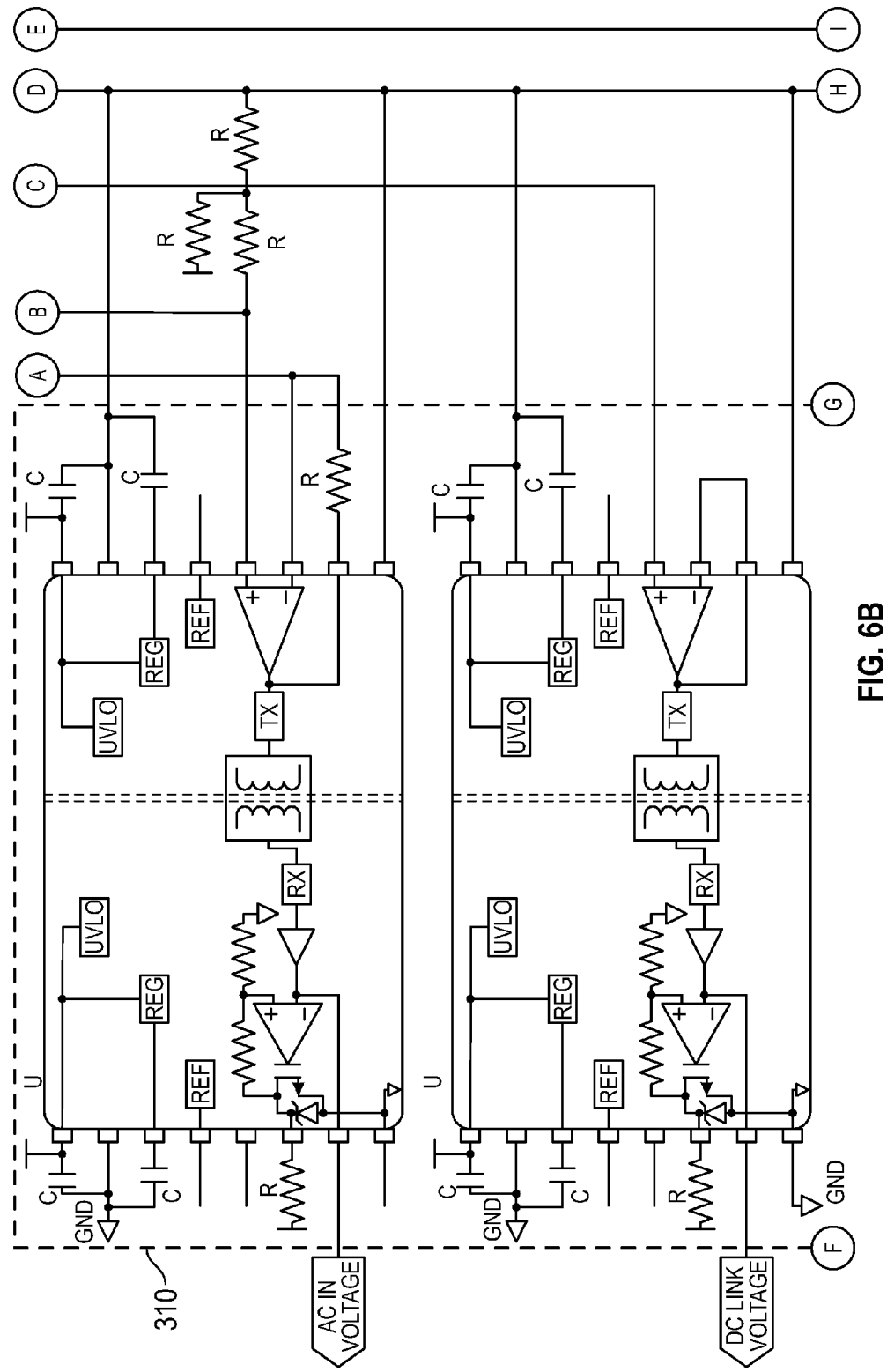
Figure 6C:
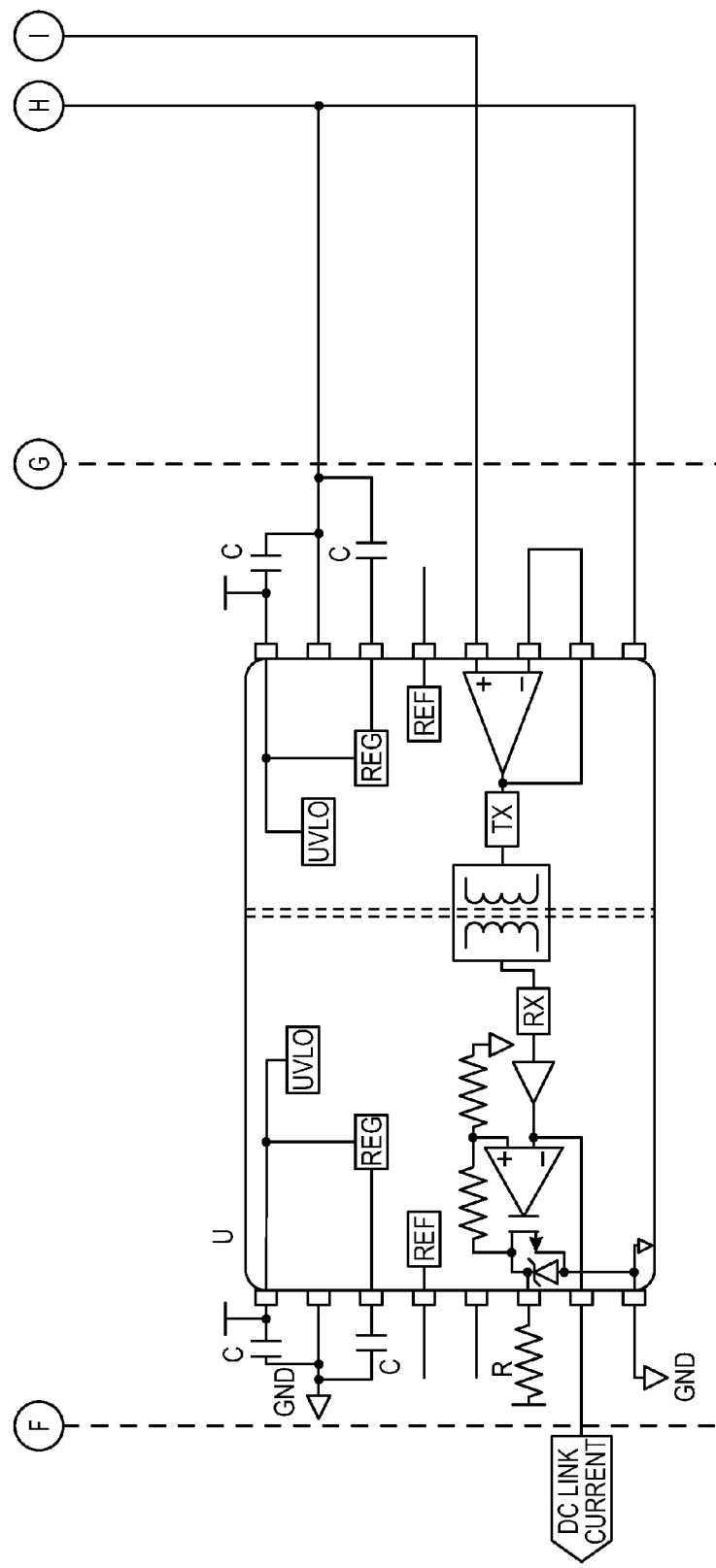

A preferred rectifier sub circuit 30 is illustrated in FIGS. 6A-6C and comprises a diode bridge input and diode bridge output. The VAC supply input first terminal 42, VAC supply input second terminal 44, and VAC supply input third terminal 46 are respectively coupled to the diode bridge input. The diode bridge output is coupled to the rectifier sub circuit output 30. In the illustrated embodiment, the VAC supply input first terminal 42, VAC supply input second terminal 44, and VAC supply input third terminal 46 are respectively connected to diode bridge input nodes or terminals, 302A, 302B, and 302C, respectively, as is known in the art, and the electrical transfer characteristics of the diodes connected as illustrated create a high voltage direct current voltage potential or differential at the diode bridge output nodes or terminals, 308A and 308B. The terminals of an inrush limiter relay 312 may be coupled electrically in series with at least one of the diode bridge input terminals, 302A and 302B to prevent damage to the rectifier sub circuit 30 components from high currents at the rectifier VAC input 302. The inrush limiter relay 312 may be controlled by an inrush bypass limiter relay enable signal from the controller 200 in the event of high currents at the rectifier VAC input 302. A capacitor may be coupled between diode bridge output terminals, 308A and 308B, to store charge and filter the DC power. A voltage and current sensing sub circuit 306 is also coupled to the diode bridge output terminals, 308A and 308B, to provide feedback from the rectifier sub circuit 30 to the controller 200. Voltage sensing is accomplished by measuring, sampling, or monitoring the voltage at a node between at least two series connected resistors that are coupled between the diode bridge output terminal 308A and 308B. Current sensing is accomplished with a current sensing circuit having a current sense resistor in coupled electrically series between the diode bridge and the positive diode bridge output terminal 308A. The voltage sensing node and current sense readings are input to the sensing output circuit 310 that isolates the inverter sub circuit 50 and outputs the sensed voltage and current to the controller 200. At least one input of the diode bridge input terminal 302B may also be input to the sensing output circuit 310 for feedback to the controller 200. Direct current voltage available from the rectifier sub circuit 30 is coupled to the inverter sub circuit 50, which creates an inverter three phase output from the direct current voltage as controlled by the controller 200.

Figure 7A:
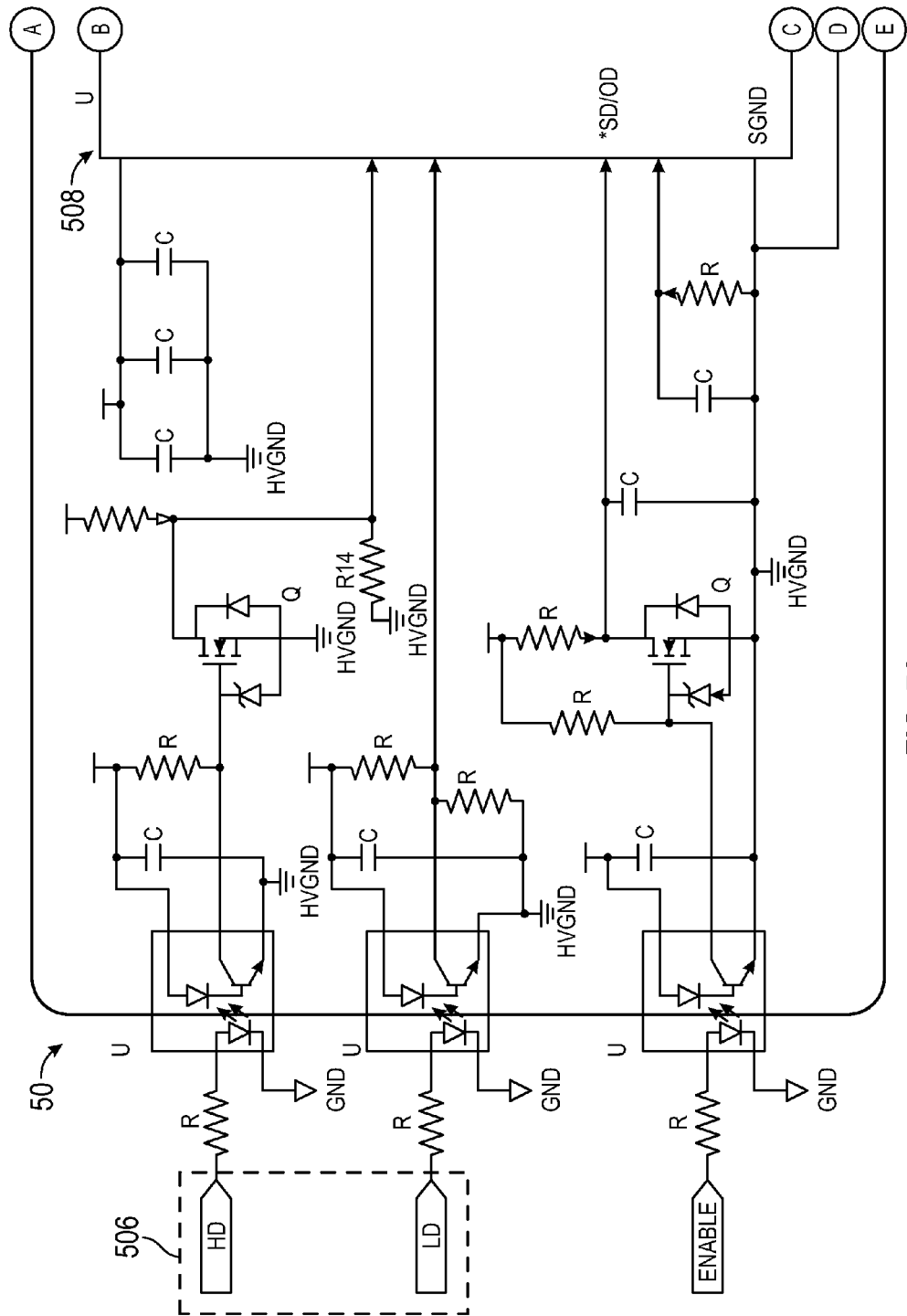
FIGS. 7A-7B illustrate an inverter sub circuit 50 including plurality of inverter circuit switching inputs 506, signal conditioning circuitry, a solid state gate driver 508, and a pair of power transistors electrically coupled in a VAC push-pull output configuration 510.
Figure 7B:
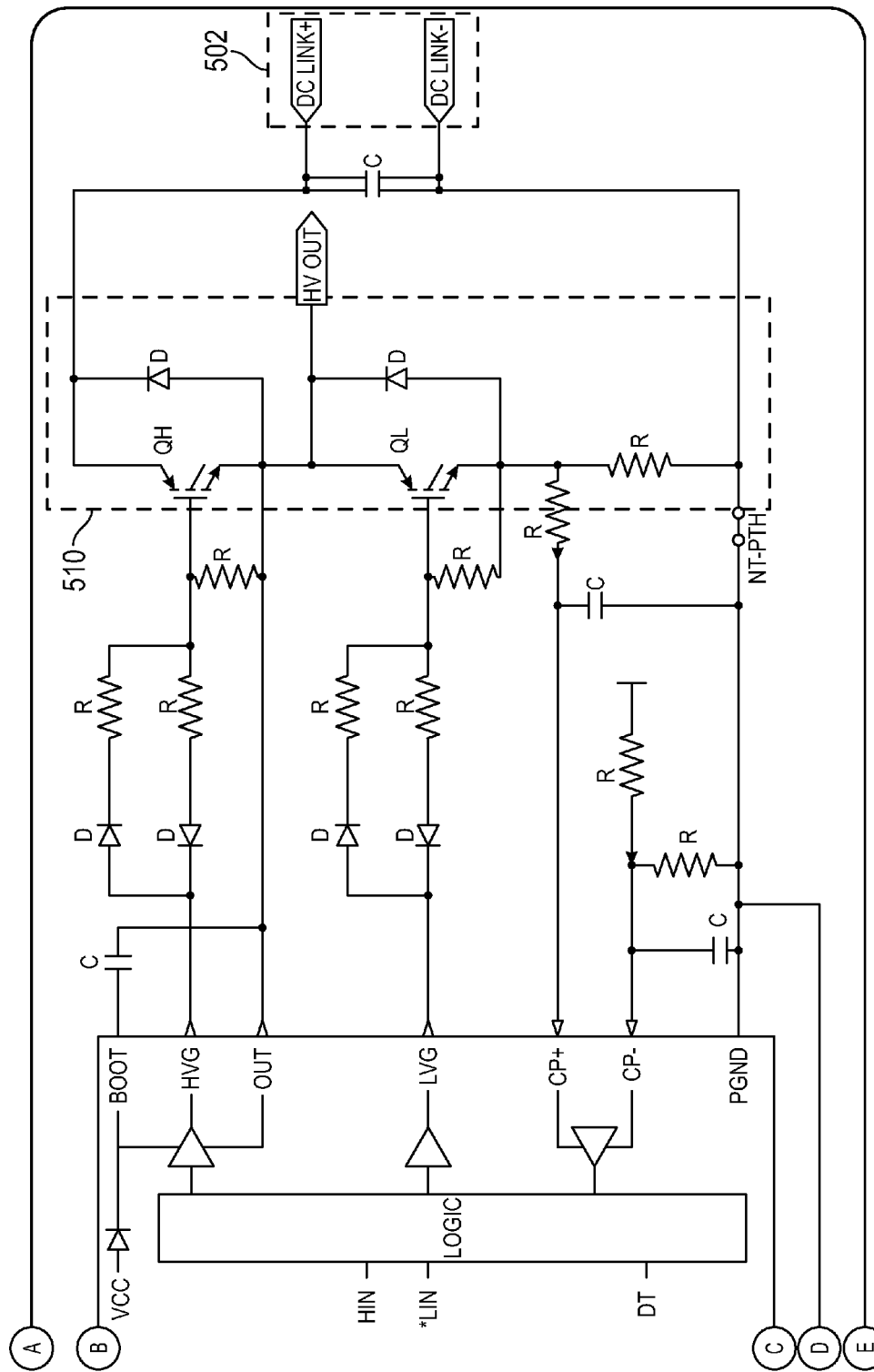
Figure 8:
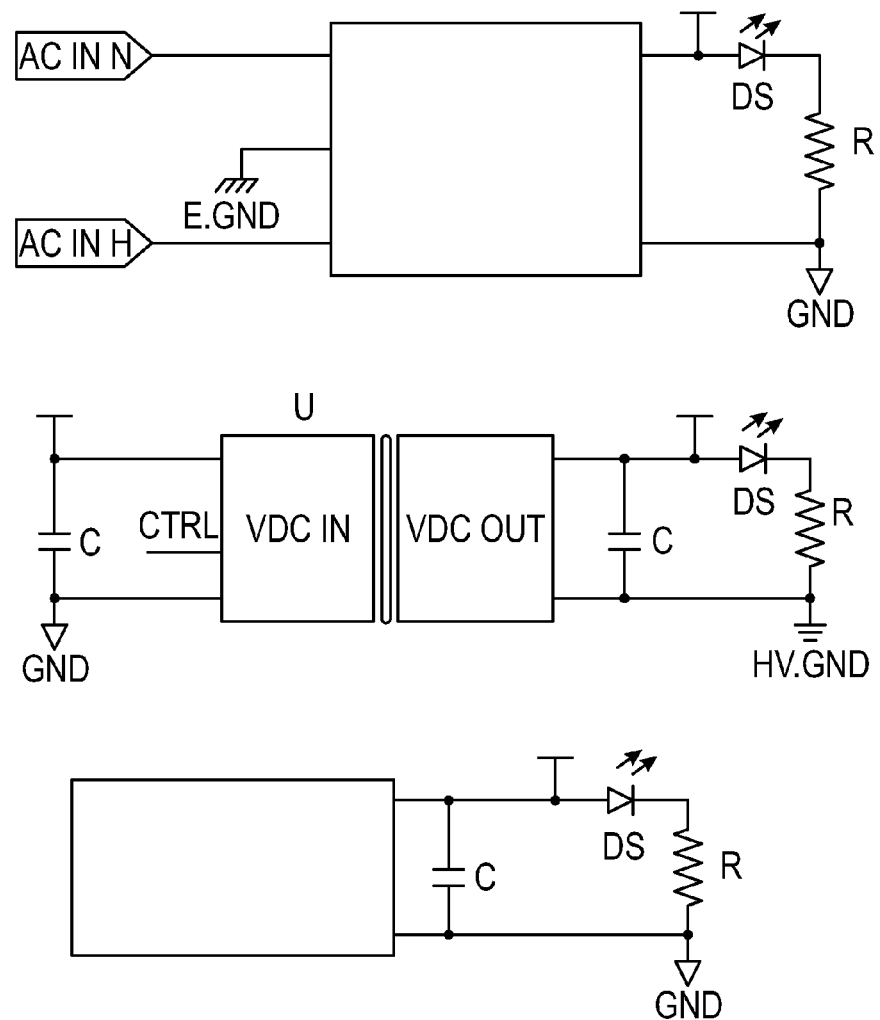
FIG. 8 illustrates additional circuitry to create DC voltages used within the embodiment to power components requiring regulated DC voltage and current.
Figure 9:
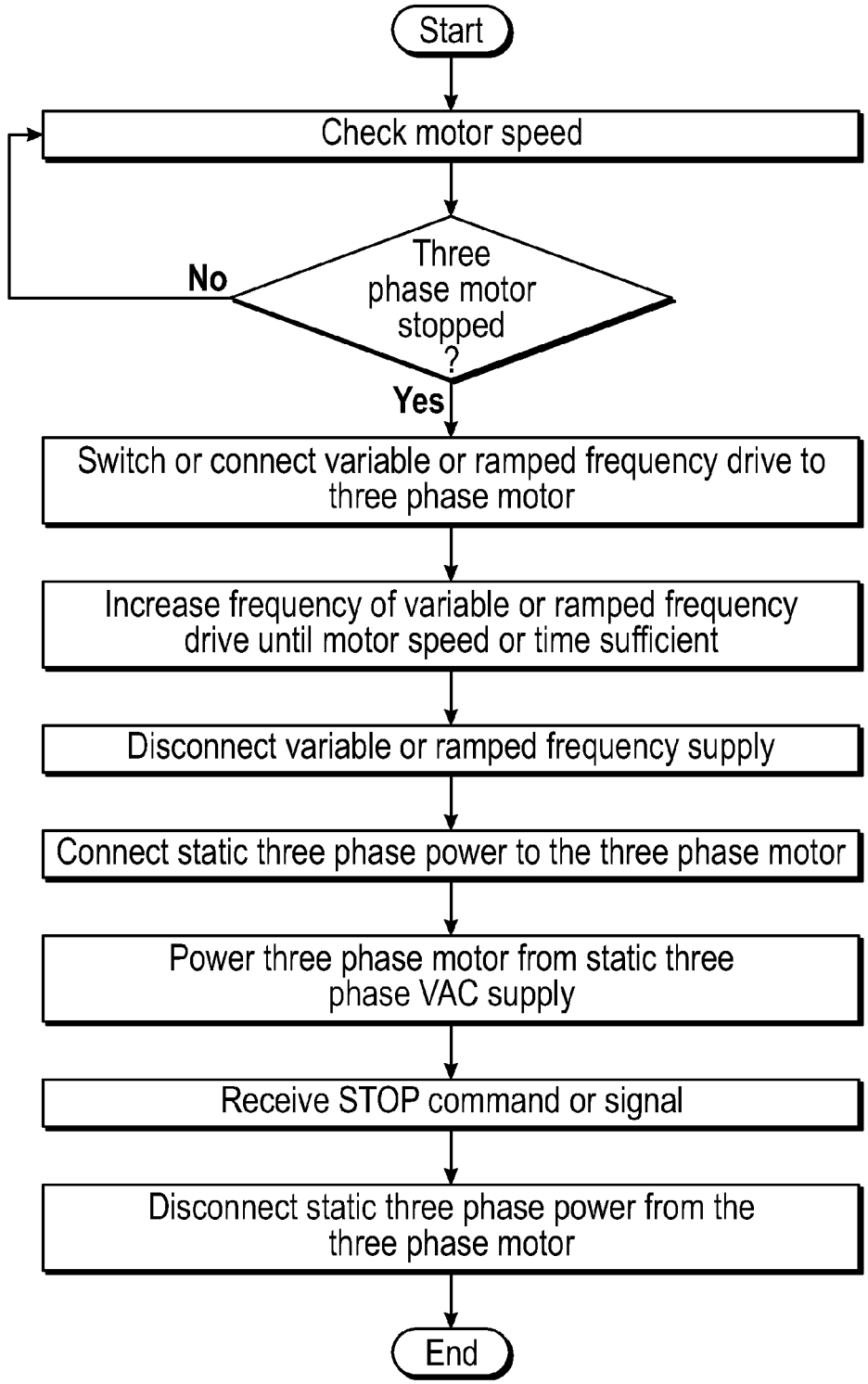
FIG. 9 illustrates a flow diagram for operating an embodiment of the process or method of the description.

The preferred inverter sub circuit 50 is illustrated in FIGS. 7A-7B and comprises three inverter outputs that produce three-phase VAC power as controlled by the controller 200. A portion or third of a preferred inverter sub circuit 50 is illustrated in FIG. 7 and includes an inverter circuit DC input 502 that is coupled to the diode bridge output terminals 308A and 308B of the rectifier sub circuit 30. The illustrated inverter sub circuit 50 outputs a single switched VAC output and therefore is duplicated twice more to create three switched VAC outputs that are each controllable by the controller 200 to produce a single phase of the three phase switched VAC output, respectively. Each inverter sub circuit 50 includes an isolated input stage, such as by solid state optical isolators, comprised of at least one inverter circuit switching input, but preferably complementary, inverter circuit switching inputs 506, that are coupled to the input of an integrated solid state gate driver circuit 508 the outputs of which are coupled to the gates of power transistors electrically coupled together as a push-pull output 510 configuration. Each of the VAC push-pull outputs 510 are each coupled to the inverter three phase output 504, and in particular, the inverter first phase output 504A, inverter second phase output 504B, and the inverter third phase output 504C, respectively, which are each connectable to the VAC output first terminal 62, the VAC output second terminal 64, and the VAC output third terminal 66, respectively, through the inverter contactor. As is known in the art, the power transistors may comprise Insulated Gate Bipolar Junction Transistors (IGBT) or MOSFETs depending on the performance desired or the size or horsepower of the three phase motor 10 and as illustrated, a high-voltage Schottky diode may be electrically coupled across the collector and emitter of the IGBT to protect the transistors from damage due to over-voltage.

The inverter sub circuit 50 and controller 200 create a variable frequency drive (VFD) with programmable and controllable three-phase VAC power that is output from the static three phase to variable or ramped three phase converter via the VAC output 60. The controller 200 is programmed or programmable to increase the frequency of the plurality of inverter control outputs 202 from 0 Hz to a steady-state switching frequency, which is preferably at least about the steady-state operating frequency of the three phase motor 10 but preferably greater. As one example, the steady state frequency can be in the range of about 40-80 Hz, but preferably should be about 70-80 Hz. Further, while the preferred static three phase to variable or ramped three phase converter embodiment described herein comprises a VFD having a voltage-source drive inverter design, it would be within the skill of one having ordinary skill to modify the design herein to implement a phase controlled current-source inverter drive. Or alternatively, it may be preferably to slowly increase the amplitude of the inverter circuit 3-phase output signals to reduce inrush current to the three phase motor 10.

Operation Modes

In steady-state mode the static three phase to variable or ramped three phase converter provides three phase VAC power, and in startup mode the static three phase to variable or ramped three phase converter produces three-phase power with a variable or ramping frequency. Steady-state mode is characterized by the static three phase to variable or ramped three phase converter outputting ramped or variable three-phase power at the VAC output 60. The VAC output 60 is thereafter coupleable to a three phase motor 10 to start and operate the three phase load or motor 10. Steady-state mode is ordinarily operated after the static three phase to variable or ramped three phase converter has brought the three phase motor 10 up to or above steady-state operating frequency upon the completion of startup mode.

In steady-state mode, the controller 200 opens the inverter contactor 130 and closes the AC DIRECT relay 120, which couples static three phase VAC supply 4 directly to the VAC output 60 to power the three phase motor 10. Thus in steady-state mode, each phase of the static three phase VAC supply 4 is coupled to one input of the three phase VAC supply input 40. In the preferred embodiment, the VAC supply input first terminal 42 is coupled to the TPST relay input first terminal 122A, the VAC supply input second terminal 44 is coupled to the TPST relay input second terminal 124A, and the VAC supply input third terminal 46 is coupled to the TPST device input third terminal 122C. And, the electrically operable AC DIRECT relay 120 is closed so the TPST relay input first terminal 122A is coupled to the TPST relay output first terminal 122B, the TPST relay input second terminal 124A is coupled to the TPST relay output second terminal 124B, and the TPST relay input third terminal 124A is coupled to the TPST relay output third terminal 124B, which are respectively connected to the VAC output 60 terminals to output three phase power from the static three phase to variable or ramped three phase converter. Finally, in steady-state mode the controller 200 may disable the rectifier sub circuit 30 and/or the inverter sub circuit 50 to conserve power.

Startup mode is characterized by the static three phase to variable or ramped three phase converter outputting three-phase power with gradually increasing or ramped frequency at the VAC output 60. In startup mode the AC direct relay (e.g. the electrically operable TPST relay 120) is open-circuited and the inverter contactor (e.g. the electrically operable TPST relay 130) is closed and the rectifier sub circuit 30 and inverter sub circuit 50 create three-phase power that is coupled via the second contactor 13 to the VAC output 60 to power the three phase motor 10. In startup mode the controller 200 closes the inverter contactor 130, which allows the three phase VAC power from the inverter sub circuit 50 to flow through the VAC output 60 and gradually start the three phase motor 10 with a gradually increasing frequency. The static three phase to variable or ramped three phase converter can be used with a method to start and run a three phase motor 10 with reduced inrush current. A preferred method comprises creating three-phase VAC power with a variable frequency drive, switching-in and starting the three phase motor 10 with the variable frequency drive, and then switching-out the variable frequency drive and switching-in a static three phase VAC supply 4 to continue powering the three phase motor 10.

An example three phase motor 10 has a steady-state operating frequency and a three phase motor first terminal 10A, a three phase motor second terminal 10B, and a three phase motor third terminal 10C. A method of starting the three phase motor 10 with the static three phase to variable or ramped three phase converter comprises coupling the three phase motor 10 to the VAC output 60, the VAC output first terminal 62, the VAC output second terminal 64, and the VAC output third terminal 66, coupled to the three phase motor first terminal 10A, the three phase motor second terminal 10B, and the three phase motor third terminal 10C. The first, second, and third phase of a static three phase VAC supply 4 is coupled to a VAC supply input first terminal 42, a VAC supply input second terminal 44, and a VAC supply input third terminal 46. The VAC output first terminal 62, VAC output second terminal 64, and VAC output third terminal 66 are coupled to the inverter first phase output 504A, the inverter second phase output 504B, and the inverter third phase output 504C, respectively. To start the three phase motor 10, the static three phase VAC supply 4 is converted to a direct current voltage and the direct current voltage is switched with the variable frequency drive to generate an inverter three phase output 504 comprised of an inverter first phase output 504A, an inverter second phase output 504B, and an inverter third phase output 504C. Moreover, the frequency of the variable frequency drive is increased from a starting frequency of about 0 Hz to a steady state frequency within about 20 Hz of the steady-state operating frequency of the three phase motor 10. Alternatively, the frequency of the variable frequency drive is increased gradually, such as linearly or non-linearly, from a starting frequency of about 0 Hz for a time delay of about 3 to 15 seconds. After reaching the steady-state operating frequency or expiration of the time delay, the inverter three phase output 504 is disconnected from the VAC output 60 and the VAC supply input first terminal 42 is coupled to the three phase motor first terminal 10A, the VAC supply input second terminal 44 is coupled to the three phase motor second terminal 10B, and the VAC supply input third terminal 46 is coupled to the three phase motor third terminal 10C.

For startup mode, because the inverter contactor 130 is coupled electrically in series between the inverter three phase output 504 and the VAC output 60, coupling the VAC output first terminal 62, VAC output second terminal 64, and VAC output third terminal 66 to the inverter first phase output 504A, the inverter second phase output 504B, and the inverter third phase output 504C, respectively, comprises respectively connecting the plurality of inverter contactor 130 input terminals to the plurality of inverter contactor 130 output terminals. Similarly, disconnecting the inverter first phase output 504A, inverter second phase output 504B, and inverter third phase output 504C from the VAC output first terminal 62, the VAC output second terminal 64, and the VAC output third terminal 66, respectively, comprises disconnecting the plurality of inverter contactor 130 input terminals from the plurality of inverter contactor 130 output terminals. For steady-state mode, because the AC DIRECT relay 120 is coupled electrically in series between the three phase VAC supply input 40 and the VAC output 60, coupling the VAC supply input first terminal 42 to the three phase motor first terminal 10A, coupling the VAC supply input second terminal 44 to the three phase motor second terminal 10B, and coupling the VAC supply input third terminal 46 to the three phase motor third terminal 10C comprises respectively connecting the plurality of AC DIRECT relay 120 input terminals to the plurality of AC DIRECT relay 120 output terminals.

Alternatively, the AC DIRECT relay 120 may comprise a first switch, a second switch, and a third switch that each comprise electrically operable relays and include a first, second, and third switch control terminal, respectively, and closing the first, second, and third switches comprises receiving at least one control signal such as from a timer or from a controller 200 to the switch control terminals. Again, each switch may be each selected from switches, contactors and relays and may comprise an electrically operable triple pole single throw switch, relay or contactor.

Moreover, the step of coupling the VAC output first terminal 62, the VAC output second terminal 64, the VAC output third terminal 66 to the inverter first phase output 504A, the inverter second phase output 504B, and the inverter third phase output 504C, respectively, may comprise closing a third switch having a third switch input terminal that is coupled to the inverter first phase output 504A and a third switch output terminal coupled to the VAC output first terminal 62, closing a fourth switch comprising a fourth switch input terminal coupled to the inverter second phase output 504B and a fourth switch output terminal coupled to the VAC output second terminal 64, and closing a firth switch having a firth switch input terminal that is coupled to the inverter third phase output 504C and a third switch output terminal coupled to the VAC output third terminal 66. The third switch, the fourth switch, and the fifth switch, may be each selected from switches, contactors and relays and each comprise an electrically operable triple pole single throw switch, relay or contactor. Closing the third switch, the fourth switch, and fifth switch comprises receiving at least one control signal from a controller 200 or a timer circuit to the third switch control terminal, the fourth switch control terminal, and the fifth switch control terminal, respectively.

Operation of the static three phase to variable or ramped three phase converter may further include control of a plurality of inverter circuit switching inputs 506 and increasing the frequency of the variable frequency drive from a starting frequency of about 0 Hz to a steady state frequency within about 20 Hz of the steady-state operating frequency comprises increasing the switching frequency of the plurality of inverter circuit switching inputs 506 from a starting frequency of about 0 Hz to a steady state frequency within about 20 Hz of the steady-state operating frequency. The controller 200 may include a plurality of inverter control outputs 202 that are respectively connected to the plurality of inverter circuit switching inputs 506 and the controller 200 may increase the switching frequency of the plurality of inverter control outputs 202 from a starting frequency of about 0 Hz to a steady state frequency within about 20 Hz of the three phase motor 10 steady-state operating frequency. Further, as previously described the AC direct relay may comprise a distinct switches acting in unison or may comprise an electrically operable TPST device and the inverter contactor may comprise distinct switches acting in unison or may comprise a combination electrically operable TPST device.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A three phase motor starter, comprising:
a three phase VAC supply input and a VAC output;
an AC direct relay coupled electrically in series between the three phase VAC supply input and the VAC output;
a rectifier having a rectifier VAC input and a rectifier DC output, the rectifier VAC input coupled to the three phase VAC supply input;
an inverter having an inverter circuit DC input, a plurality of inverter circuit switching inputs, and an inverter circuit three phase output, the inverter circuit DC input coupled to the rectifier DC output;
an inverter contactor coupled electrically in series between the inverter circuit three phase output and the VAC output; and
a controller having a plurality of inverter control outputs respectively coupled to the plurality of inverter circuit switching inputs;
wherein a three phase VAC supply is connectable to the VAC output through the AC direct relay and the inverter circuit three phase output is connectable to the VAC output through the inverter contactor.

2. The three phase motor starter in claim 1 wherein,
the AC direct relay includes a relay control terminal, the inverter contactor includes a contactor control terminal, and the controller includes a relay control output and an inverter contactor control output coupled to the relay control terminal and the inverter contactor control terminal, respectively.

3. The three phase motor starter in claim 2 wherein,
the AC direct relay is selected from switches, relays, and contactors.

4. The three phase motor starter in claim 2 wherein,
the inverter contactor is selected from switches, relays, and contactors.

5. The three phase motor starter in claim 2 wherein,
the plurality of inverter control outputs further comprises an inverter control first output, an inverter control second output, and an inverter control third output that output a first phase, a second phase, and a third phase switching signal, respectively.

6. The three phase motor starter in claim 5 wherein,
the controller operates a software program to increase the frequency of the switching signals from 0 Hz to a frequency within about 20 Hz of the steady-state frequency.

7. The three phase motor starter in claim 2 wherein,
the rectifier comprises a diode bridge input and diode bridge output, at least one of the VAC supply input terminals coupled to the diode bridge input, the diode bridge output coupled to the rectifier output.

8. A method of starting a three phase motor and operating the motor at a steady-state frequency, comprising
coupling a three phase motor to a VAC output;
connecting a three phase VAC supply to a three phase VAC supply input;
converting the three phase VAC supply to a direct current voltage;
switching the direct current voltage with a variable frequency drive;
coupling the VAC output to the variable frequency drive;
with the variable frequency drive, switching the direct current voltage from a starting frequency of about 0 Hz to a frequency within about 20 Hz of the three phase motor steady-state operating frequency;
disconnecting the variable frequency drive from the VAC output; and
coupling the three phase VAC supply input to the VAC output.

9. The method of claim 8 wherein,
a first switch is coupled electrically in series between the variable frequency drive and the VAC output and disconnecting the variable frequency drive comprises operating the switch to prevent current flow between the variable frequency drive and the VAC output.

10. The method of claim 9 wherein,
the first switch is electrically operable and selected from switches, relays and contactors and operating the first switch comprises receiving a control signal to a first switch control terminal.

11. The method of claim 10 wherein,
the first switch comprises an electrically operable TPST device.

12. The method of claim 8 wherein,
a second switch is coupled electrically in series between the three phase VAC supply input and the VAC output.

13. The method of claim 9 wherein,
the second switch is electrically operable and selected from switches, relays and contactors and the coupling three phase VAC supply input to the VAC output includes receiving a control signal to a second switch control terminal.

14. The method of claim 13 wherein, the second switch comprise an electrically operable TPST device.

15. The method of claim 8 wherein, the variable frequency drive comprises a plurality of inverter circuit switching inputs and increasing the frequency of the variable frequency drive from a starting frequency of about 0 Hz a frequency within about 20 Hz of the steady-state operating frequency comprises increasing the switching frequency of the plurality of inverter circuit switching inputs from a starting frequency of about 0 Hz to a frequency within about 20 Hz of the steady-state operating frequency.

16. The method of claim 15 wherein, a controller has plurality of inverter control outputs that are respectively connected to the plurality of inverter circuit switching inputs and the controller increases the switching frequency of the plurality of inverter control outputs from a starting frequency of about 0 Hz to a frequency within about 20 Hz of the steady-state operating frequency.

17. A three phase load starter, comprising:

a three phase VAC supply input and a VAC output;

a first switch, selected from switches, relays and contactors, coupled electrically in series between the three phase VAC supply input and the VAC output;

a rectifier having a rectifier VAC input and a rectifier DC output, the rectifier VAC input coupled to the three phase VAC supply input;

an inverter having an inverter circuit DC input, a plurality of inverter circuit switching inputs, and an inverter circuit three phase output, the inverter circuit DC input coupled to the rectifier DC output;

a second switch, selected from switches, relays, and contactors, coupled electrically in series between the inverter circuit three phase output and the VAC output; and a controller having a plurality of inverter control outputs respectively coupled to the plurality of inverter circuit switching inputs;

wherein a three phase VAC supply is connectable to the VAC output through the first switch and the inverter circuit three phase output is connectable to the VAC output through the second switch.

18. The three phase motor starter in claim 17 wherein, the first switch and second switch are each electrically operable and selected from distinct or combination switches, relays and contactors.

* * * * *